United States Patent [19]

Falk et al.

[11] Patent Number: 4,957,904

[45] Date of Patent: Sep. 18, 1990

[54] PERFLUOROALKYLTHIOGLYCOSIDES

[75] Inventors: Robert A. Falk, New City, N.Y.;
Kirtland P. Clark, Bethel, Conn.;
Gregory R. Coughlin, Katonah, N.Y.

[73] Assignee: Ciba-Geigy Corporation, Ardsley, N.Y.

[21] Appl. No.: 353,586

[22] Filed: May 18, 1989

Related U.S. Application Data

[63] Continuation-in-part of Ser. No. 286,553, Dec. 19, 1988, abandoned.

[30] Foreign Application Priority Data

May 24, 1988 [CH] Switzerland ............... 01963/88

[51] Int. Cl.$^5$ ............... A61K 31/00; C07G 3/00; C07H 15/00; B01F 17/00
[52] U.S. Cl. ............... 514/24; 536/4.1; 536/17.5; 536/17.6; 536/18.4; 514/832; 252/351; 252/354; 252/355; 422/45
[58] Field of Search ............... 536/4.1, 17.5, 17.6, 536/18.4; 514/24, 832; 252/354, 355, 351; 422/45

[56] References Cited

U.S. PATENT DOCUMENTS

| | | | |
|---|---|---|---|
| 3,598,865 | 8/1971 | Low | 536/18.4 |
| 4,435,387 | 3/1984 | Schaub et al. | 514/24 |
| 4,468,385 | 8/1984 | Callahan et al. | 514/24 |

FOREIGN PATENT DOCUMENTS 61-7288  1/1986  Japan .

OTHER PUBLICATIONS

R. D. Poretz et al., Biochemistry 9, 2890 (1970).
J. Greiner et al., Tetrahedron Letters 29, 2193 (1988).

Primary Examiner—Johnnie R. Brown
Assistant Examiner—Everett White
Attorney, Agent, or Firm—Luther A. R. Hall; JoAnn Villamizar

[57] ABSTRACT

Novel nonionic perfluoroalkylthioglycosides of the formula, $R_f$-E-S-saccharide are described, wherein $R_f$ is a straight or branched chain perfluoroalkyl of 1 to 18 carbon atoms or said perfluoroalkyl substituted by perfluoroalkoxy of 2 to 6 carbon atoms, E is a connecting group, and the saccharide is a mono-, di-, or higher oligosaccharide, comprising 1 to 30 units of 5, 6 or 7 carbon-membered sugars.

19 Claims, No Drawings

PERFLUOROALKYLTHIOGLYCOSIDES

This is a continuation-in-part application of application Ser. No. 286,553, filed on Dec. 19, 1988 now abandoned.

BACKGROUND OF THE INVENTION

This invention relates to perfluoralkylthioglycosides and their use as surfactants in biochemistry and in general surfactant applications.

Alkyl glycosides are well known and have long been used for biochemical research. However, they are expensive detergents and their use has been limited to small scale experiments.

Alkyl thioglycosides are disclosed in JP 61/7288(1986). These compounds possess much improved properties over the O-analogs and have many of the desirable properties usually required for solubilization, purification and reconstitution of membrane proteins. These properties include a high solubilizing power, non-denaturation of proteins, a high Critical Micelle Concentration (CMC), a non-ionic nature, optical transparency, high chemical purity, high solubility in water, stability to acidic and enzymatic hydrolysis, inertness to protein assays, and ease of synthesis.

A limited number of perfluoroalkyl glycosides have been reported, namely 1,1,1-trifluoroethyl glucoside, in Biochem. 9,(140) 2890-6(1970), and several 2-(F-hexyl)-ethanol and 11-(F-hexyl)-10-undecanol derivatives, namely 2'-F-hexyl)-ethyl substituted D-glucopyranoside, D-galacto-pyranoside, and 11'-(F-hexyl)-10'-undecenyl-D-maltoside, in Tet. Letters 29,(18) 2193-4(1988), and oligomeric glycosides derived from 1,1,11-trihydroperfluoroundecanol, in U.S. Pat. No. 3,598,865. No. perfluoroalkyl-thiosaccharides have previously been disclosed.

DETAILED DISCLOSURE One aspect of this invention relates to novel perfluoroalkyl-thioglycosides that are readily prepared from atoxic sugars. These compounds have high solubilizing power, electrical neutrality, and are considerably more stable than prior-art alkyl perfluoroalkylglycosides. Further, they possess numerous other desirable properties; are non-denaturing to proteins, have a high CMC, are nonionic in nature, are optically transparent, have high chemical purity, have a high solubility in water, are stable to acidic and enzymatic hydrolysis, are inert to protein assays, and are easily synthesized. Another aspect of this invention relates to the use of such novel fluorochemical surfactants in artificial blood formulations since they are inherently compatible with the fluorochemicals used in such blood substitutes.

In addition, this invention provides a method to prepare stable fluorochemical emulsions, a method for the solubilization and reconstitution of proteins and methods for enzyme inhibition.

The perfluoroalkylthioglycosides of this invention have the general formula

$$R_f\text{-E-S-saccharide} \quad (I)$$

where $R_f$ is a straight or branched chain perfluoroalkyl of 1 to 18 carbon atoms or said perfluoroalkyl substituted by perfluoroalkoxy of 2 to 6 carbon atoms, E is a branched or straight chain alkylene of 1 to 10 carbon atoms, or said alkylene interrupted by one to three groups selected from the group consisting of —NR—, —O—, —S—, —SO$_2$—, —COO—, —OOC—, —CONR—, —NRCO—, —SO$_2$NR—, and —NR-SO$_2$—, or is terminated at the $R_f$ end with —CONR— or —SO$_2$NR—, where $R_f$ is attached to the carbon or sulfur atom, R is independently hydrogen, alkyl of 1 to 6 carbon atoms or hydroxyalkyl of 2 to 6 carbon atoms, and saccharide is a mono-, di-, or higher oligosaccharide comprising 1–30 units of a 5, 6, or 7 carbon-membered sugar, including, but not limited to glucose, fructose, mannose, galactose, talose, allose, altrose, idose, arabinose, xylose, lyxose, ribose, or mixture thereof.

Preferably the instant compounds of formula I are those where $R_f$ is a straight or branched chain perfluoroalkyl of 1 to 12 carbon atoms or perfluoroalkyl of 2 to 6 carbon atoms substituted by perfluoroalkoxy of 2 to 6 carbon atoms, E is a straight or branched chain alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_z$NHCH$_2$CH$_2$—, —CH$_2$CH$_2$OCH$_2$CH$_2$—, or —SO$_z$NHCH$_2$CH$_2$—, R is independently hydrogen, alkyl of 1 to 6 carbon atoms or hydroxyalkyl of 2 to 6 carbon atoms, and saccharide is a mono-, di- or higher oligosaccharide comprising 1 to 6, preferably 1 to 3, units of a 5, 6, or 7 carbon-membered sugar or mixture thereof. Most preferred are those compounds where $R_f$ is a straight or branched chain perfluoroalkyl of 6 to 12 carbon atoms, E is ethylene, R is independently hydrogen, alkyl of 1 to 6 carbon atoms or hydroxyalkyl of 2 to 6 carbon atoms, and saccharide is comprised of 1 to 3 units of 6 carbon-membered sugars including glucose, mannose or galactose, most particularly glucose.

It is understood that the $R_f$ group usually represents a mixture of perfluoroalkyl moieties. When the $R_f$ group is identified as having a certain number of carbon atoms, said $R_f$ group also usually concomitantly contains a small fraction of perfluoroalkyl groups with a lower number of carbon atoms and a small fraction of perfluoroalkyl groups with a higher number of carbon atoms.

The novel $R_f$-thiosaccharides can be obtained by the reaction of a perfluoroalkyl thiol of formula $R_f$-E-SH with an oligosaccharide or acylated (generally acetylated) oligosaccharide containing from 1 to 30 units of 5, 6, or 7 carbon membered sugars, including, but not limited to glucose, fructose, mannose, galactose, talose, allose, altrose, idose, arabinose, xylose, lyxose, ribose, or mixtures thereof.

In one preferred embodiment, the saccharide is glucose pentaacetate. In another it is maltose octaacetate. These intermediates are commercially available in high purity; other intermediates are cellobiose octaacetate, galactose pentaacetate, pentoses, hexoses, heptoses, disaccharides, trisaccharides, tetrasaccharides, polysaccharides, and 0-alkyl polysaccharides.

The synthesis of the thiosaccharides can be accomplished by the following methods, namely: (a) condensation between glycosyl halide esters and perfluoroalkylthiolates; (b) S-substitution of 1-thiosugars; (c) partial hydrolysis of aldose diperfluoroalkylacetals; (d) isomerization of other 1-thioglycosides; (e) direct, acid-catalyzed thiolysis of free sugars or glycosyl esters; and trans-thioglycosidation of O-alkyl polysaccharides with thiols.

Other procedures less commonly reported for synthesizing 1-thioglycosides may be used and involve (a) thiolysis of 3,4,6-tri-O-acetyl-1,2-anhydro-D-glucose; (b) pyrolysis of glycosyl xanthate esters; (c) photochemical additions of thiols to unsaturated compounds and (d) sulfur extrusions from glycosyl disulfides. The thiolysis of aldoses, glycosides, and peracetylated sugars under acidic conditions is a generally applicable procedure which is an extension of the Helferich method for preparing acyl glycoside peracetates. The first efficient thiolysis of sugar esters was effected by Lemieux and Brice in 1955, but the recent publications of Ferrier and Furneaux using $BF_3$ catalysis (1976–1980) have proven to be the method of choice.

The preferred synthetic method requires the use of boron trifluoride catalysis of a homogeneous reaction of the subject glycoside peresters and a perfluoroalkyl thiol in chloroform. The reaction proceeds more readily with trans-peresters but also with the cis-isomers. The reaction uses near equimolar proportions of thiols and proceeds smoothly at 20–65° C. in chloroform, requiring between 1 and 50 hours, and giving moderately high yields of product. Other non-$BF_3$ reactive solvents can be used including carbon tetrachloride, methylene chloride, ethers, and the like.

The perester product is isolated by evaporation, chromatography, or crystallization. The perfluoroalkylthiosaccharide is obtained by deacetylation. A mixture of methanol, triethylamine and water may be used for deacetylation and requires from 1–3 days at room temperature. The product is separated from the acetate counterion by ion-exchange chromatography using a basic (OH) ion exchange resin, followed by freeze drying to isolate the pure thiosaccharide. For isolation procedures, see Koeltzow and Urfer J. Am. Oil Chem. Soc. 61 (10), 1651–5 (1984).

Alternately, perfluoroalkyl thiols may be reacted by transthioglycosidation, similarly to the methods described for alcohols described in U.S. Pat. Nos. 3,547,828, 4,510,306, 4,663,444, U.S. Statutory Invention Registration H 171(1986), and E.P. 00923559, 0132043, 0132046, and 0096917. These documents generally disclose trans- glycosidation procedures which are economically practical.

Alternate reaction schemes based on Fischer type acetalizations, Koenigs Knorr, enzymatic, and alkali catalyzed thioether formation can be used. Further 1-S-substituted perfluoroalkyl-thiosaccharides, though not described earlier, may be obtained by using the methods taught in U.S. 4,663,444 (1987).

It is also possible to oxidize the subject perfluoroalkylthiosaccharides to the corresponding sulfonyl derivatives. For example, 1-Deoxy-1-(methylsulfonyl)-alpha-D-mannopyranose was prepared by oxidation of the corresponding thiosaccharide and is reported in J. Biol. Chem., 259 (3), 1764–9 (1984).

Perfluoroalkyl thiols useful herein are well documented in the prior art. For example, thiols of the formula $R_f$-E-SH have been described in a number of U.S. Pats. including U.S. Pat. Nos. 3,655,732 and 4,584,143.

Thus, U.S. Pat. No. 3,655,732 discloses mercaptans of formula:

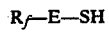

where E is alkylene of 1 to 16 carbon atoms and $R_f$ is perfluoroalkyl. Reaction of $R_fI$ with ethylene under freeradical conditions gives $R_f(CH_2CH_2)I$ while reaction of $R_4CHzI$ with ethylene gives $R_fCH_2(CH_2CH_2)_aI$ as is further taught in U.S. Pat. Nos. 3,088,849; 3,145,222; 2,965,659 and 2,972,638.

U.S. Pat. No. 3,655,732 further discloses compounds of formula

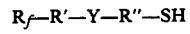

where R' and R" are alkylene of 1 to 16 carbon atoms, with the sum of the carbon atoms of R' and R" being no greater than 25; $R_f$ is perfluoroalkyl of 4 to 14 carbon atoms and Y is —S—or —NR'''—, where R''', is hydrogen or alkyl of 1 to 4 carbon atoms. U.S. Pat. No. 3,544,663 discloses that the mercaptan

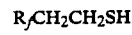

where $R_f$ is perfluoroalkyl of 5 to 13 carbon atoms, can be prepared by reacting the perfluoroalkylalkylene iodide with thiourea or by adding $H_2S$ to a perfluoroalkyl substituted ethylene ($R_f$—CH=$CH_2$), which in turn can be prepared by dehydrohalogenation of the $R_f$—$CH_2$$CH_2$—halide.

The reaction of the iodide $R_f$—E—I with thiourea followed by hydrolysis to obtain the mercaptan $R_f$—E—SH is the preferred synthetic route. The reaction is applicable to both linear and branched chain iodides. Particularly preferred herein are the thiols of formula

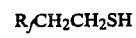

where $R_f$ is perfluoroalkyl of 6 to 12 carbon atoms. These $R_f$-thiols can be prepared from $R_fCH_2CH_2I$ and thiourea in very high yield.

The resultant perfluoroalkylthiosaccharides, particularly when prepared from pure, homogeneous saccharides, can be used to prepare fluorinated emulsions and microemulsions of fluorochemicals as synthetic blood substitutes.

Accordingly, the instant invention also pertains to a stable, aqueous emulsion, suitable for use as a synthetic blood substitute, which comprises (a) a fluorochemical oxygen carrier, and (b) an effective amount of a compound of the formula $R_f$-E-S-saccharide described above. Preferably such amounts of component (b) are in the range of 0.01 to 2.00% by weight of the total emulsion.

It is expected that such emulsions will be useful as injectable $O_2$-carriers. The necessary criteria for such emulsions include solubilization of fluorochemical oxygen carriers, stability, nonionic character, chemical inertness, biological acceptance, non-hemolytic behavior, and industrial feasibility. In contrast to the ready preparation of monodisperse perfluoroalkyl thiosaccharides with high water solubility, the synthesis of monodisperse nonionic surfactants from oligoethylene glycols is increasingly difficult for the most desirable higher oligomers.

It should be noted that the reaction of 1,1,2,2-tetrahydroperfluoroalkanols proceeds abnormally with bromotetraacetylglucose (Koenigs-Knorr reaction) to yield an orthoester. The reaction of the corresponding thiol proceeds normally with pentaacetylglucose to yield the desired thioglucoside.

The perfluoroalkylthiosaccharides according to the present invention exhibit high surface activity in aqueous solutions. Depending on the choice of the perfluoroalkyl and saccharide substituents, dilute solutions may exhibit surface tensions below 17 dynes/cm. at 0.01% by weight of perfluoroalkylthiosaccharide added.

Accordingly, the present invention encompasses a method of decreasing the surface tension of an aqueous solution comprising the addition of an effective amount of a perfluoroalkylthioglycoside of the present invention, or a mixture thereof; preferably about 0.0001 to about 2.0 wt. percent is added.

The invention is illustrated, but not limited by the following examples:

EXAMPLE 1

1.1.2.2-Tetrahydroperfluoro-b-D-thiogluoopvranoside Tetraacetate

Penta-O-acetyl b-D-glucopyranose (30.0 g, 76.9 mmol) and 1,1,2,2-tetrahydroperfluorooctanethiol (32.1 g, 84.6 mmol) are dissolved in 90 ml of chloroform followed by the addition of a catalytic amount of boron trifluoride etherate (1.5 g, 22.1 mmol). The mixture is heated under nitrogen reflux for 2 hours and then extracted twice with saturated sodium bicarbonate solution and twice with distilled water. The chloroform is then removed under vacuum to yield a clear syrup which solidifies into a white solid (73% by GLC). Recrystallization from hexane/acetone (12:1) yields a white crystalline solid of m.p. 86-87° C. (100% by GLC).

Analysis for $C_{22}H_{23}F_{13}O_4S$:
Calculated: C, 37.2; H, 3.3; F, 34.8; S, 4.5.
Found: C, 37.0; H, 3.1; F, 33.9; S, 4.4.

EXAMPLE 2

1,1,2,2-Tetrahvdroperfluoro-octane-b-D-Thio-glucopyranose

The tetraacetate from the Example 1 is dissolved in a solution (300 ml) consisting of methanol, triethylamine and water (2:2:1) and stirred at room temperature for 15 hours until deacetylation is complete. The solution is then passed through a column packed with Amberlite IRA-400 (OH) ion-exchange resin. The product is eluted with methanol and isolated by removing the methanol under vacuum followed by freeze-drying to yield a white crystalline solid of m.p. 218° C. (94% by GLC).

NMR shows proton resonances at 2.59 ppm, 2 protons, $CF_2$—$\underline{CH_2}$; 2.93 ppm, 2 protons, $\underline{CH_2}$—S; 3.28 ppm, 4 protons, HO—C—$\underline{H}$; 3.64 ppm and 3.85 ppm, 1 proton each, $CH_2$—OH; 4.42 ppm, 1 proton, S—C—$\underline{H}$.

Analysis for $C_{14}H_{15}H_{13}O_5S$:
Calculated: C, 31 0; H, 2.8; F, 45.5; S, 5 9.
Found: C, 30.9; H, 2.7; F, 43.6; S, 6.3.

Surface Properties in Distilled Water (Dynes/cm)

| Conc. (% by wt.) | Surface Tension |
| --- | --- |
| 0.01 | 16.9 |
| 0.001 | 36.2 |
| 0.0001 | 60.7 |

EXAMPLE 3

1,1,2,2 Tetrahydroperfluorooctane-b-D-thio Glucopvranoside Octaacetate

Octa-O-acetyl-b-D-maltopyranose (20.0 g, 29.5 mmol) and 1,1,2,2-tetrahydroperfluoro-octanethiol (12.3 g, 32.4 mmol) are dissolved in 70 ml of chloroform followed by the addition of a catalytic amount of boron trifluoride etherate (0.5 g, 7.3 mmol). The mixture is heated under nitrogen at reflux for 2.5 hours and then extracted twice with saturated sodium bicarbonate solution and twice with distilled water. The chloroform is then removed under vacuum to yield a deep orange syrup. This syrup is dissolved in heptane/acetone (9:1), placed on a flash chromatography column packed with silica gel and eluted with heptane/acetone (9:1). Fractions are taken, followed by glc, and the solvent is removed from selective fractions under vacuum to yield a white crystalline solid of m.p. 105-107° C.

Analysis for $C_{34}H_{39}F_{13}O_{17}S$:
Calculated: C, 40.9; H, 3.9; F, 24.7; S, 3.2.
Found: C, 40.9; H, 4.2; F, 23.9; S, 3.5.

EXAMPLE 4

1,1,2,2 Tetrahvdrooerfluoro-octane-b-D-thiomaltopvranose

The material from Example 3 is dissolved in a deacetylating solution (400 ml) consisting of methanol, triethylamine, and water (2:2:1). The solution is stirred at room temperature for 15 hours to complete the deacetylation. The solution is the placed on a column packed with Amberlite IRA-400 (OH) ion exchange resin. The product is diluted with methanol and isolated by removing the methanol under vacuum, followed by freeze drying, to yield a white crystalline solid of m.p. 279° C. (dec.).

Analysis for $C_{20}H_{25}F_{13}O_{10}S$:
Calculated: C, 34.1; H, 3.6; F, 35.1; S, 4.6.
Found: C, 34.1; H, 3.6; F, 33.7; S, 4.4.

Surface Properties in distilled water

| Conc. % by wt. | Surface Tension dynes/cm | Interfacial Tension dynes/cm |
| --- | --- | --- |
| 0.10 | 22.2 | 7.7 |
| 0.01 | 24.4 | 11.9 |
| 0.001 | 45.2 | 28.1 |

EXAMPLES 5-16

Using the methods described and by techniques similar to Examples 1-4, additional thiosaccharides are prepared from selected fluorochemical precursors and saccharide intermediates as shown in Examples 5 to 16.

| | Fluorochemical Precursor Intermediate | Saccharide |
| --- | --- | --- |
| 5 | $CF_3CF_2CH_2SH$ | glucose pentaacetate |
| 6 | $C_6F_{13}(CH_2)_4SH$ | methyl glycoside |
| 7 | $C_8F_{17}CH_2CH_2CH_2SH$ | maltose octaacetate |
| 8 | $C_8F_{17}CH_2CH_2N(CH_3)CH_2CH_2CH_2SH$ | glucose pentaacetate |
| 9 | $C_8F_{17}SO_2NHCH_2CH_2SH$ | galactose pentaacetate |
| 10 | $C_8F_{17}CH_2CH_2I$ | 2,3,4-tri-O-acetyl-1-thio-L-fucopyranose |
| 11 | $C_7F_{15}CONHCH_2CH_2SH$ | cellobiose octaacetate |
| 12 | $CF_3CF_2CH_2CH_2SH$ | butyl malto-oligosaccharide |
| 13 | $CF_8F_{17}CH_2CH_2SH$ | glucose |
| 14 | $C_8F_{17}CH_2CH_2SO_2NHCH_2CH_2SH$ | glucose pentaacetate |
| 15 | $C_6F_{13}CH_2CH_2I$ | 1-thio-b-D-mannose |
| 16 | $C_8F_{17}CH_2CH_2SH$ | starch |

What is claimed is:

1. A compound of the formula $R_f$-E-S-saccharide
wherein
$R_f$ is a straight or branched chain perfluoroalkyl of 1 to 18 carbon atoms or said perfluoroalkyl substituted by perfluoroalkoxy of 2 to 6 carbon atoms;

E is branched or straight chain alkylene of 1 to 10 carbon atoms or said alkylene interrupted by up to three groups selected from the group consisting of —NR—, —O—, —S—, —SO$_2$—, —COO—, —OOC—, —CONR—, —NRCO—, —SO$_2$NR—, and —NRSO$_2$—, or is terminated at the $R_f$ end with —CONR— or —SO$_2$NR—, where $R_f$ is attached to the carbon or sulfur atom, and where R is independently hydrogen, alkyl of 1 to 6 carbon atoms or hydroxyalkyl of 2 to 6 carbon atoms; and saccharide is a mono-, di-, or higher oligosaccharide comprising 1 to 30 units of a 5, 6, or 7 carbon-membered sugar or mixture thereof.

2. A compound according to claim 1 wherein $R_f$ is a straight or branched chain perfluoroalkyl of 1 to 12 carbon atoms or perfluoroalkyl of 2 to 6 carbon atoms substituted by perfluoroalkoxy of 2 to 6 carbon atoms.

3. A compound according to claim 1 wherein said $R_f$ is a straight or branched chain perfluoroalkyl of 1 to 12 carbon atoms.

4. A compound according to claim 1 wherein said $R_f$ is a straight or branched chain perfluoroalkyl of 6 to 12 carbon atoms.

5. A compound according to claim 1 wherein E is a straight or branched chain alkylene of 2 to 6 carbon atoms, or E is —CONHCH$_2$CH$_2$—, —CH$_2$CH$_2$N(CH$_3$)CH$_2$CH$_2$—, —CH$_2$CH$_2$SO$_2$NHCH$_2$CH$_2$—, —CH$_2$CH$_2$OCH$_2$CH$_2$—, or —SO$_2$NHCH$_2$CH$_2$—.

6. A compound according to claim 1 wherein said E is a branched or straight chain alkylene of 2 to 6 carbon atoms.

7. A compound according to claim 1 wherein said E is ethylene.

8. A compound according to claim 1 wherein said saccharide is a mono-, di-, or higher oligosaccharide comprising 1 to 6 units of a 5, 6, or 7 carbon-membered sugar or mixture thereof.

9. A compound according to claim 1 wherein said saccharide is a mono-, di-, or higher oligosaccharide comprising 1 to 3 units of a 5, 6, or 7 carbon-membered sugar or mixture thereof.

10. A compound according to claim 1 wherein said sugar is a 6 carbon-membered sugar.

11. A compound according to claim 1 wherein said sugar is selected from the group consisting of glucose, fructose, mannose, galactose, talose, allose, altrose, idose, arabinose, xylose, lyxose, ribose and mixtures thereof.

12. A compound according to claim 11 wherein said sugar is selected from the group consisting of glucose, mannose, galactose and mixtures thereof.

13. A compound according to claim 12 wherein said sugar is glucose.

14. A compound according to claim 1 wherein $R_f$ is perfluoroalkyl of 6 to 12 carbon atoms, E is ethylene and saccharide is a mono-, di-, or higher oligosaccharide comprising 1 to 3 units of a 5, 6, or 7 carbon-membered sugar.

15. A compound according to claim 1 wherein the saccharide is glucose pentaacetate or maltose octaacetate.

16. A stable, aqueous emulsion, useful as a synthetic blood substitute, which comprises
  (a) a fluorochemical oxygen carrier, and
  (b) an effective amount of a compound according to claim 1.

17. A method of decreasing the surface tension of an aqueous solution comprising adding an effective amount of a compound or mixture of compounds according to claim 1 to said aqueous solution.

18. A method according to claim 17 wherein the effective amount is about 0.0001 to about 2.0 wt. %.

19. A method according to claim 17 wherein said surface tension is decreased to below 17 dynes/cm at 0.01% by weight of perfluoroalkyl-thiosaccharide added.

* * * * *